June 12, 1934.  E. ROTH  1,962,573

SIFTING MACHINE FOR MIDDLINGS, SEMOLINA, AND THE LIKE, PARTICULARLY GRITS

Filed May 2, 1932  2 Sheets-Sheet 1

Inventor:
Ernst Roth
By Sommers & Young
Attys.

June 12, 1934.  E. ROTH  1,962,573
SIFTING MACHINE FOR MIDDLINGS, SEMOLINA, AND THE LIKE, PARTICULARLY GRITS
Filed May 2, 1932  2 Sheets-Sheet 2
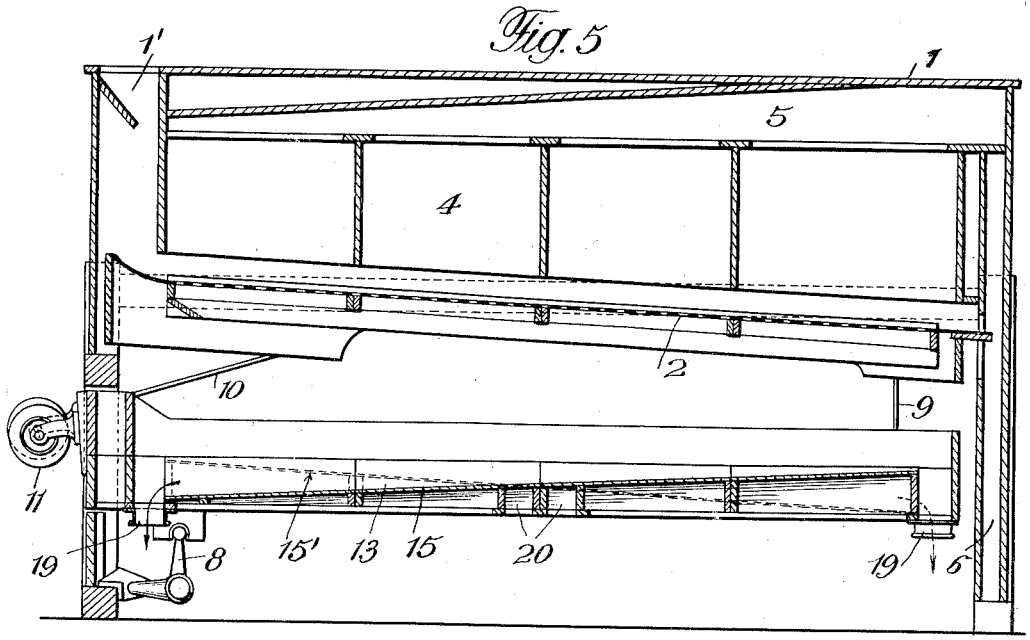
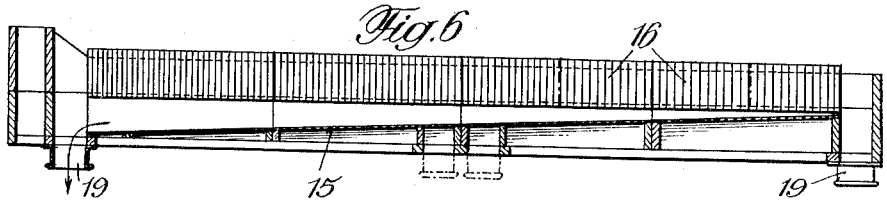
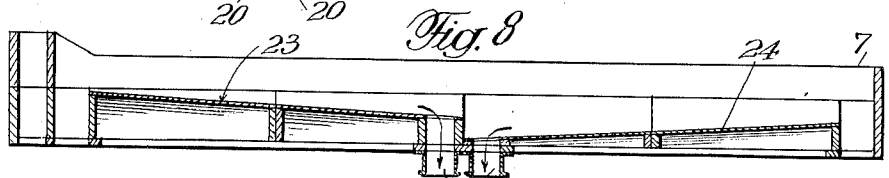
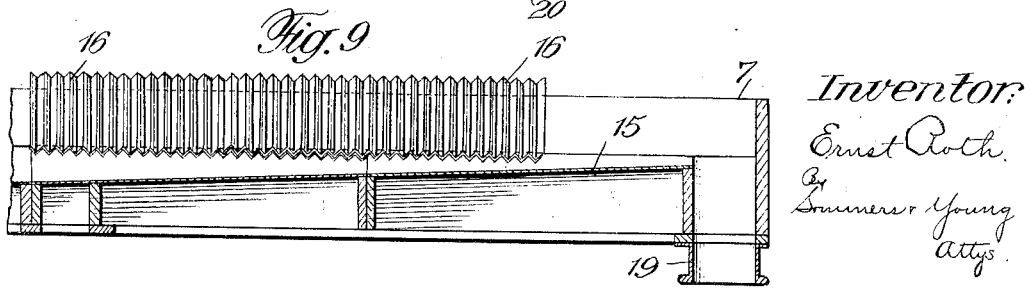
Inventor:
Ernst Roth
By Summers & Young
Attys.

Patented June 12, 1934

1,962,573

UNITED STATES PATENT OFFICE 1,962,573

SIFTING MACHINE FOR MIDDLINGS, SEMO-
LINA, AND THE LIKE, PARTICULARLY
GRITS

Ernst Roth, Niederuzwil, Switzerland, assignor to
the firm Gebruder Buhler, Uzwil, Switzerland Application May 2, 1932, Serial No. 608,803
In Germany August 21, 1931

1 Claim. (Cl. 209—257)

This invention relates to sifting machines for middlings, semolina and the like, particularly grits.

In the modern mill practice it is of vital importance that with machines of this kind the delivery means for the dressed goods are readily adjustable, so as to permit educting the goods at different points from the machine according to the desired requirements of operation.

It has already been proposed to use worm conveyors as delivery means for these machines and to arrange two or more conveyors of this kind acting in opposite directions underneath the sieves of a machine in operative connection with control flaps for leading the goods dropping down from the sieves towards the conveyor acting in the desired direction. Experience has shown, however, that this manner of control was too slow for practical purposes and therefore uneconomical.

According to the present invention, instead of the worm conveyors at least two shaking conveyors or troughs are provided underneath the sieves in horizontal disposition and equipped with longitudinally slanting bottoms, removable cover members being provided for covering a trough on top in laterally inclined relation to an adjacent trough and adapted to be longitudinally displaced on the troughs for sheltering any portion of the same along their length against the goods dropping from the sieves and leading parts of these goods into the respective adjacent trough.

Figure 1:
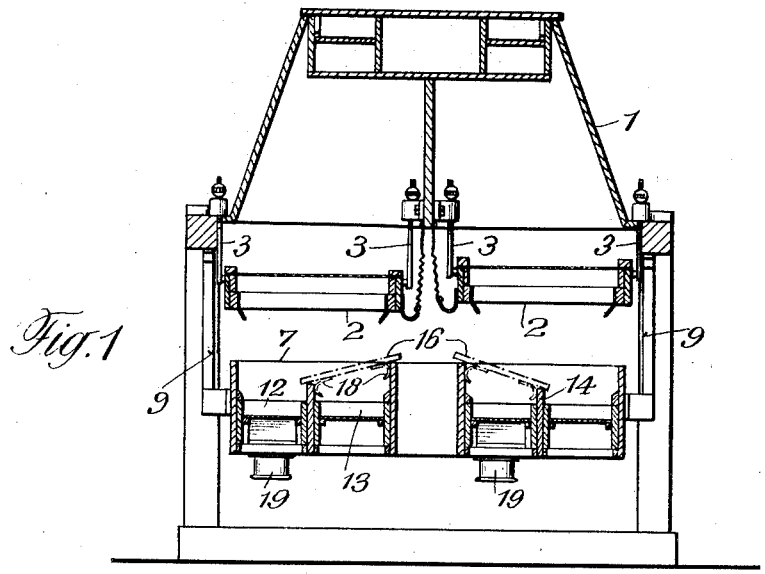
Figure 2:
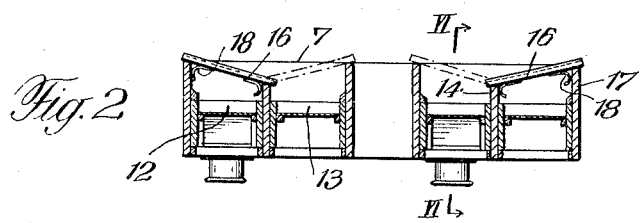
Figure 3:
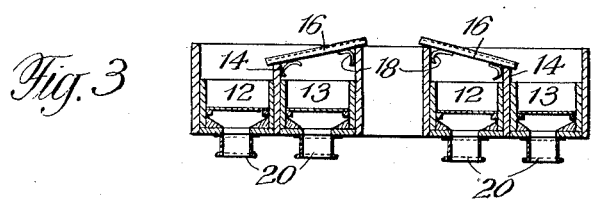
Figure 4:
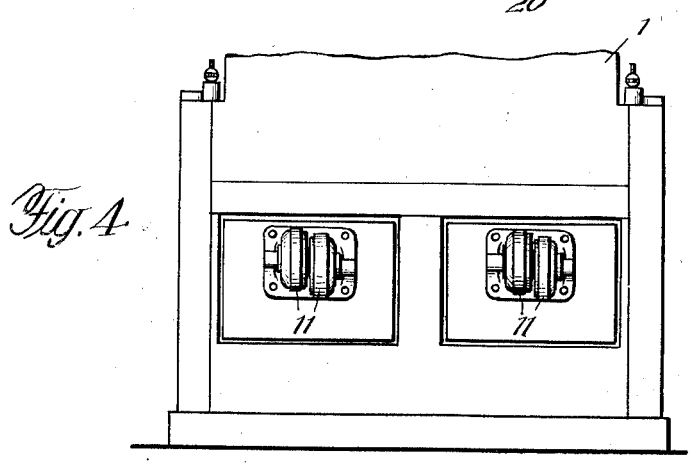

In the accompanying drawings several constructional forms of the invention are illustrated by way of example only in which Fig. 1 is a cross section of a grits cleaning machine comprising two reciprocating sieves disposed alongside of each other, Fig. 2 is a detail section of Fig. 1 showing one shaking trough of a pair associated with each sieve and covered on top by inclined cover members, Fig. 3 is a detail section similar to Fig. 2 showing the cover members changed over to the respective adjacent shaking troughs, Fig. 4 is a fragmentary end elevation of the machine illustrating vibrating appliances for actuating the shaking troughs and the sieves, Fig. 5 is a longitudinal section through the machine, Fig. 6 is a detail section of Fig. 5 on the line VI—VI in Fig. 2, Fig. 7 is a longitudinal section of a variant construction for the bottom of the troughs, Fig. 8 is a view similar to Fig. 7 of another modification, and Fig. 9 is a fragmentary sectional view on a larger scale showing cover members for sheltering the top of a trough applied to a portion of its length only.

Referring to the drawings, 1 denotes the casing of a grits cleaning machine comprising a feed chute 1'. Two reciprocatory screens or sieves 2 are yieldingly connected to the frame 1 by swingable rods 3. The material elevated by the air current applied to the underside of the sieves passes into expansion chambers 4 to subsequently leave the machine through ducts 5, whereas the oversize material is conveyed by the sieves to delivery chutes 6. Underneath the sieves 2 a solid frame 7 is swingably supported at one end on arms 8, linked to the casing 1, and at the other end suspended from the casing by swingable rods 9. The frame 7 forms the lower part of the machine and reciprocates, for example, by means of connecting stays 10 together with the sieves 2, the frame 7 being actuated by vibrating devices 11 secured to the same on the outside of one of the end walls of the machine. Within the frame 7 two shaking troughs 12, 13 for educting the goods from the machine are accommodated which are separated by a partition wall 14 and provided with longitudinally slanting bottoms 15, for example of sheet metal (Figs. 5, 6 and 9). The bottoms 15 are detachably arranged in the frame 7, so as to permit of inserting the same in the frame in a position turned 180° about a vertical axis when it is desired to direct the undersize material dropping down from the screen towards the opposite end of the machine by means of the respective trough.

The shaking troughs 12, 13 are adapted to be covered on top by cover members 16 in the form of corrugated sheet metal plates of corrugated cross section, for the purpose of sheltering one of the troughs against the goods dropping down from the related screen and deviating these goods towards the adjacent trough, the bottom 15' of which slants axially in the other direction, as indicated in dotted lines in Fig. 5. To this end the side wall 17 of the frame 7 is made higher than the middle partition wall 14 so that the plates 16, when laid on the top edges of these walls assume a position to the central axis of the combined troughs 12, 13 of sufficient inclination to cause the undersize material dropping on the plates from above to slide down on the plates into the adjoining trough. Suitably the plates are cut in shorter lengths than the trough, thus allowing to cover a trough along the full length thereof, as shown in Fig. 6, or only certain portions of the same, as indicated in Fig. 9, wherein the end plate is shifted inwardly relatively to the other plates. Alternatively the plates may be changed over from one side of a pair of associated troughs to the other which a glance at the Figs. 2 and 3 will make clear. The arrangement of the plates may also be such that alternating portions of adjacent troughs are covered. In this manner the distribution of the undersize material over the bottom area of adjoining troughs can be varied at will depending on the disposition of the covering plates on the top of the troughs.

The connection of the plates to the top portions of the adjacent walls of the troughs may be effected by clamping springs 18 fastened to both longitudinal edges of the plates respectively, as indicated in the Figs. 1 and 2. Alternatively springs for gripping over both edges of a wall, for example the outer wall of the frame 7 may be secured to one longitudinal edge of the plates only. Naturally other suitable connection or clamping means may be provided for the plates.

Between the outlets 19 through which the undersize material leaves the troughs at the ends thereof in the direction of the arrows (see Figs. 1, 6 and 8) intermediate outlets 20 may be arranged for educting parts of the cleaned grits from the troughs out of the machine. In this case above the respective intermediate outlet a hole is provided in the bottom of the trough.

When it is desired to deliver the cleaned grits from a trough substantially intermediate the ends of the machine, the bottom of the respective trough may be made in two portions 21, 22 slanting towards each other for delivering the grits through two outlets 20 nearer the one end of the machine, in the direction of the arrows in Fig. 7. For educting the cleaned grits in the centre of the machine an arrangement may be provided as shown in Fig. 8 with two oppositely slanting bottom portions 23, 24 of equal lengths.

It is obvious that for special requirements of delivering the cleaned grits the bottoms of correlated shaking conveyors may be arranged to slant longitudinally in the same way.

Instead of associating only two troughs 12, 13 with each other for cooperation with a sieve three or more troughs may be combined in a common assembly on one side of the machine.

I claim:

In a sifting machine for middlings, semolina, and the like, particularly grits, in combination, at least one sieve, at least two horizontally disposed shaking conveyors associated with each sieve and combined in a common assembly underneath the sieve, longitudinally slanting bottoms provided for said conveyors, removable cover members for selectively covering a conveyor in sloping relation to an adjacent conveyor and adapted to overlap each other to a desired extent in the longitudinal direction of the conveyor for partly sheltering the combined bottom area of the conveyors against the cleaned goods dropping from the sieve and deviating the respective part of the goods towards said adjacent conveyor, means for clampingly connecting said cover members to the top portions of said conveyors, outlets for the cleaned goods provided in the bottoms of said conveyors, and actuating means for said shaking conveyors adapting the latter to lead the cleaned goods as received from the sieve in conjunction with the respective distribution of said cover members over the combined bottom area of the conveyors towards the outlets.

ERNST ROTH.